US009235784B2

(12) United States Patent
Sato et al.

(10) Patent No.: US 9,235,784 B2
(45) Date of Patent: *Jan. 12, 2016

(54) MEDIA PROCESSING DEVICE AND METHOD OF CONTROLLING A MEDIA PROCESSING DEVICE

(71) Applicant: Seiko Epson Corporation, Shinjuku-ku (JP)

(72) Inventors: Yoshitake Sato, Shiojiri (JP); Eiji Ito, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/684,254

(22) Filed: Apr. 10, 2015

(65) Prior Publication Data

US 2015/0213335 A1    Jul. 30, 2015

Related U.S. Application Data

(63) Continuation of application No. 13/595,954, filed on Aug. 27, 2012, now Pat. No. 9,027,828.

(30) Foreign Application Priority Data

Sep. 1, 2011   (JP) ................................. 2011-190407

(51) Int. Cl.
| G07F 17/00 | (2006.01) |
| G06K 13/16 | (2006.01) |
| B41J 3/44 | (2006.01) |
| B41J 13/00 | (2006.01) |

(52) U.S. Cl.
CPC . *G06K 13/16* (2013.01); *B41J 3/44* (2013.01); *B41J 13/0018* (2013.01)

(58) Field of Classification Search
CPC ... G07F 19/20; G07F 7/1008; G06Q 20/1085; G06Q 30/02; G06K 17/00; G06K 7/10693; G06K 13/08; G06K 7/084; G06K 13/067; G06K 7/14; G06K 13/077; G06K 7/04
USPC ............ 235/379, 375, 462.13, 475, 476, 481
See application file for complete search history.

(56) References Cited

U.S. PATENT DOCUMENTS

| 8,490,867 B1 | 7/2013 | Ryan et al. |
| 9,027,828 B2 * | 5/2015 | Sato et al. ..................... 235/375 |

(Continued)

FOREIGN PATENT DOCUMENTS

| CN | 101174297 A | 5/2008 |
| JP | 2007-288371 A | 11/2007 |
| JP | 2010-188533 A | 9/2010 |

OTHER PUBLICATIONS

Non-Final Rejection of Jul. 10, 2014 in related U.S. Appl. No. 13/595,954—6 pages.

(Continued)

*Primary Examiner* — Karl D Frech
(74) *Attorney, Agent, or Firm* — Kilpatrick Townsend & Stockton LLP

(57) ABSTRACT

A media processing device enables continuous high-speed processing of recording media. A media processing device has a magnetic head 21 that reads information recorded on checks 4 in the check 4 conveyance path 10, a magnetic recognition unit 20b that acquires the result of a verification based on information read by the magnetic head 21, and a conveyance control unit 20a that starts conveying the check 4 to be processed next. The conveyance control unit 20a selectively operates in an individual processing mode that starts conveying the check 4 to be read next after the results of verifying the read data are acquired by the magnetic recognition unit 20b, and a continuous processing mode that starts conveying the check 4 to be read next after the magnetic head 21 reads at least part of the information without waiting for the magnetic head 21 to acquire the complete verification result.

14 Claims, 7 Drawing Sheets

(56) References Cited

U.S. PATENT DOCUMENTS

2007/0242307 A1 10/2007 Saikawa et al.
2008/0099560 A1 5/2008 Fujikawa et al.
2010/0208977 A1 8/2010 Imae et al.
2011/0033111 A1 2/2011 Fujikawa et al.

OTHER PUBLICATIONS

Notice of Allowance of Jan. 16, 2015 in related U.S. Appl. No. 13/595,954—9 pages.

* cited by examiner

MEDIA PROCESSING DEVICE AND METHOD OF CONTROLLING A MEDIA PROCESSING DEVICE

CROSS REFERENCE TO RELATED APPLICATIONS

This application is a continuation of U.S. application Ser. No. 13/595,954 filed Aug. 27, 2012, which claims priority under 35 U.S.C. §119 to Japanese Patent Application No. 2011-190407 filed Sep. 1, 2011, the entire disclosures of which are expressly incorporated by reference herein.

BACKGROUND

1. Technical Field

The present invention relates to a media processing device that reads information recorded on a recording medium, and to a method of controlling the media processing device.

2. Related Art

Media processing devices that read information recorded on recording media include devices that read magnetic information recorded on checks, for example. See, for example, Japanese Unexamined Patent Appl. Pub. JP-A-2010-188533. Such devices can run processes other than simply reading information (magnetic ink character data). The device described in JP-A-2010-188533, for example, has functions for reading magnetic ink character data, verifying the read data, and printing on the recording medium based on verification of the read data. Recording media are also generally inserted one at a time to such devices.

Even if user wants to process a large number of checks or other recording media in a short period of time, a long time is required using the method of the related art that processes recording media one at a time. More particularly, applying plural processes step by step to the recording medium, such as reading information, verifying the read information, and then executing another process such as printing, is time-consuming, and the verification step is particularly time-consuming. This makes continuously processing many recording media in a short time difficult.

SUMMARY

An object of the present invention is to provide a media processing device that can continuously process recording media such as checks at high speed, to a method of controlling the media processing device, and to a storage medium that stores a program for controlling the media processing device.

A first aspect of the invention is a media processing device capable of connecting to an external device via a communication unit, having: a conveyance unit that conveys a recording medium; an information reading unit that reads information recorded on the recording medium in the recording medium conveyance path; a verification result acquisition unit that sends information read by the information reading unit through the communication unit to the external device, and acquires the result of verifying the read information from the external device through the communication unit; and a control unit that starts conveyance by the conveyance unit of the recording medium to be processed next after the recording medium that was read, and has an individual processing mode that starts conveying the recording medium to be read next by the conveyance unit after the result of verifying the read information is acquired by the verification result acquisition unit, and a continuous processing mode that starts conveying the recording medium to be read next after the information is read by the information reading unit without waiting for the verification result acquisition unit to acquire the result of verifying the read information from the external device.

This aspect of the invention can operate in a continuous processing mode that reads information on the recording medium, sends the read information to an external device, and starts conveying the next recording medium without waiting to receive the result of verifying the read information from the external device, and can therefore continuously process multiple recording media at high speed. An individual processing mode can also be used as needed to process recording media while checking verification of the recorded information one recording medium at a time. The individual processing mode and continuous processing mode can be selected and switched by a command from the external device or a switch on the media processing device, for example.

A media processing device according to another aspect of the invention preferably also has a processing unit that processes the recording medium at a position on the recording medium conveyance path downstream in the conveyance direction from the reading position of the information reading unit; and in the continuous processing mode, the control unit does not start conveying the next recording medium to be read after at least part of the information is read by the information reading unit if the processing unit cannot process the recording medium.

This aspect of the invention does not start conveying the next recording medium if processing is not possible, such as when the next processing unit is not ready after the information reading unit has read at least part of the information on the recording medium. Conveying recording media without processing by the processing unit, and incompletely processing media, can therefore be prevented.

In another aspect of the invention, the processing unit is a print unit that prints on the recording medium; and the control unit does not start conveying the next recording medium to be read after at least part of the information is read by the information reading unit in the continuous processing mode when the data for printing has not been received from the external device through the communication unit.

By not starting conveyance of the next recording medium when the data to be printed on the recording medium has not been received and printing cannot start, conveying the recording medium without printing, and incomplete printing resulting from not receiving the data to be printed, can be prevented. Not printing and deficient printing can therefore be avoided.

A media processing device according to another aspect of the invention preferably also has a verification unit that verifies information read from the recording medium by the information reading unit without the communication unit sending the recording medium information read by the information reading unit to the external device, and without the verification result acquisition unit acquiring the result of verifying the read information from the external device.

In this aspect of the invention the media processing device can verify the read data without depending upon the external device. Recording media can also be processed continuously in this aspect of the invention without waiting for verification of data by the verification unit. Continuous processing is therefore possible even when accelerating the verification process is difficult because the time required by the verification process does not delay other processes.

Another aspect of the invention is a media processing device including a supply unit that supplies a recording medium; a conveyance unit that conveys the recording medium; an information reading unit that reads information recorded on the recording medium; and a print unit that prints on the recording medium; and a control unit that controls the conveyance unit and starts conveying the next recording medium from the supply unit when at least the leading end of the recording medium reaches the print unit after the information reading unit reads at least part of the information on the recording medium. The information reading unit and then the print unit being disposed to the recording medium conveyance path in sequence from the upstream side in the conveyance direction, and the distance along the conveyance path between the information reading unit and the print unit being shorter than the length of the recording medium in the conveyance direction.

The media processing device according to this aspect of the invention has a short conveyance path and can process media quickly because the next recording medium is conveyed when the information reading unit is determined to have read at least part of the information recorded on the recording medium, and at least a position at the leading end of the recording medium on the conveyance path has reached the position where printing by the print unit is possible. If the information recorded on the recording medium cannot be read correctly by the information reading unit because the recording medium is upside down or backwards, for example, can also be determined based on the result of recognizing at least part of the information and does not need to wait until information recorded on the recording medium has been recognized, and if the information cannot be read correctly, conveying the next recording medium does not start. The media processing device could display an appropriate warning in this case. The user can know that a problem has occurred from the warning or because conveyance of the next recording medium does not start, and can reload and process the recording medium that was conveyed in the wrong orientation. Because operation stops before printing by the print unit, printing on the wrong side can also be avoided.

A media processing device according to another aspect of the invention preferably also has a communication unit that can connect to an external device. When at least the leading end of the recording medium reaches the print unit after the information reading unit reads at least part of the information on the recording medium, the control unit starts conveying the next recording medium if the communication unit has acquired at least part of the print data from the external device, and does not start conveying the next recording medium if the print data has not been acquired.

This aspect of the invention does not start conveying the next recording medium when at least part of the print data has not been received and printing is not possible. The user can then reload the recording medium that was not conveyed and not printed for processing.

A media processing device according to another aspect of the invention preferably also has an optical reading unit that images the recording medium at a position on the recording medium conveyance path on the downstream side in the conveyance direction from the print unit. When in the continuous processing mode and the communication unit has acquired at least part of the print data from the external device, the control unit enables imaging by the optical reading unit, and does not enable imaging by the recording medium with the optical reading unit when print data has not been received.

When at least part of the print data has not been received and printing is not possible, this aspect of the invention also does not optically scan the recording medium.

Another aspect of the invention is a method of controlling a media processing device having a communication unit that can connect to an external device, a conveyance unit that conveys a recording medium, an information reading unit that reads information recorded on the recording medium in the recording medium conveyance path, and a verification result acquisition unit that sends information read by the information reading unit through the communication unit to the external device, and acquires the result of verifying the read information from the external device through the communication unit, the control method including steps of: reading information with the information reading unit; sending information read by the information reading unit to the external device; acquiring a result of verifying the read information from the external device; selecting an individual processing mode or a continuous processing mode; when in the individual processing mode, starting conveying the recording medium to be read next by the conveyance unit after the result of verifying the read information is acquired by the verification result acquisition unit; and when in the continuous processing mode, starting conveying the recording medium to be read next without waiting for the verification result acquisition unit to acquire the result of verifying the read information.

This aspect of the invention can operate in a continuous processing mode that reads information on the recording medium, sends the read information to an external device, and starts conveying the next recording medium without waiting to receive the result of verifying the read information from the external device, and can therefore continuously process multiple recording media at high speed. Processing media one at a time while verifying the information recorded on the recording medium is also possible as needed.

Another aspect of the invention is a method of controlling a media processing device that has a supply unit that supplies a recording medium, a conveyance unit that conveys the recording medium, an information reading unit that reads information on the recording medium, and a print unit that prints on the recording medium. The information reading unit and then the print unit are disposed to the recording medium conveyance path in sequence from the upstream side in the conveyance direction, and the distance along the conveyance path between the information reading unit and the print unit is shorter than the length of the recording medium in the conveyance direction. The control method includes a step of: starting conveying the next recording medium from the supply unit by the conveyance unit when at least the leading end of the recording medium reaches the print unit after the information reading unit reads at least part of the information on the recording medium.

In this aspect of the invention, the media processing device has a short conveyance path and can process media quickly because the next recording medium is conveyed when the information reading unit is determined to have read at least part of the information recorded on the recording medium, and at least a position at the leading end of the recording medium on the conveyance path has reached the position where printing by the print unit is possible. If the information recorded on the recording medium cannot be read correctly by the information reading unit because the recording medium is upside down or backwards, for example, can also be determined based on the result of recognizing at least part of the information and does not need to wait until information recorded on the recording medium has been recognized, and if the recording medium cannot be read correctly, conveying the next recording medium does not start. The media processing device could display an appropriate warning in this case. The user can know that a problem has occurred from the warning or because conveyance of the next recording medium does not start, and can reload and process the recording medium that was conveyed in the wrong orientation. Because operation stops before printing by the print unit, printing on the wrong side can also be avoided.

Effect of the Invention

A media processing device according to the invention that reads information recorded on a recording medium can process many recording media continuously at high speed.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of the present invention is described below with reference to the accompanying figures.

Figure 1:
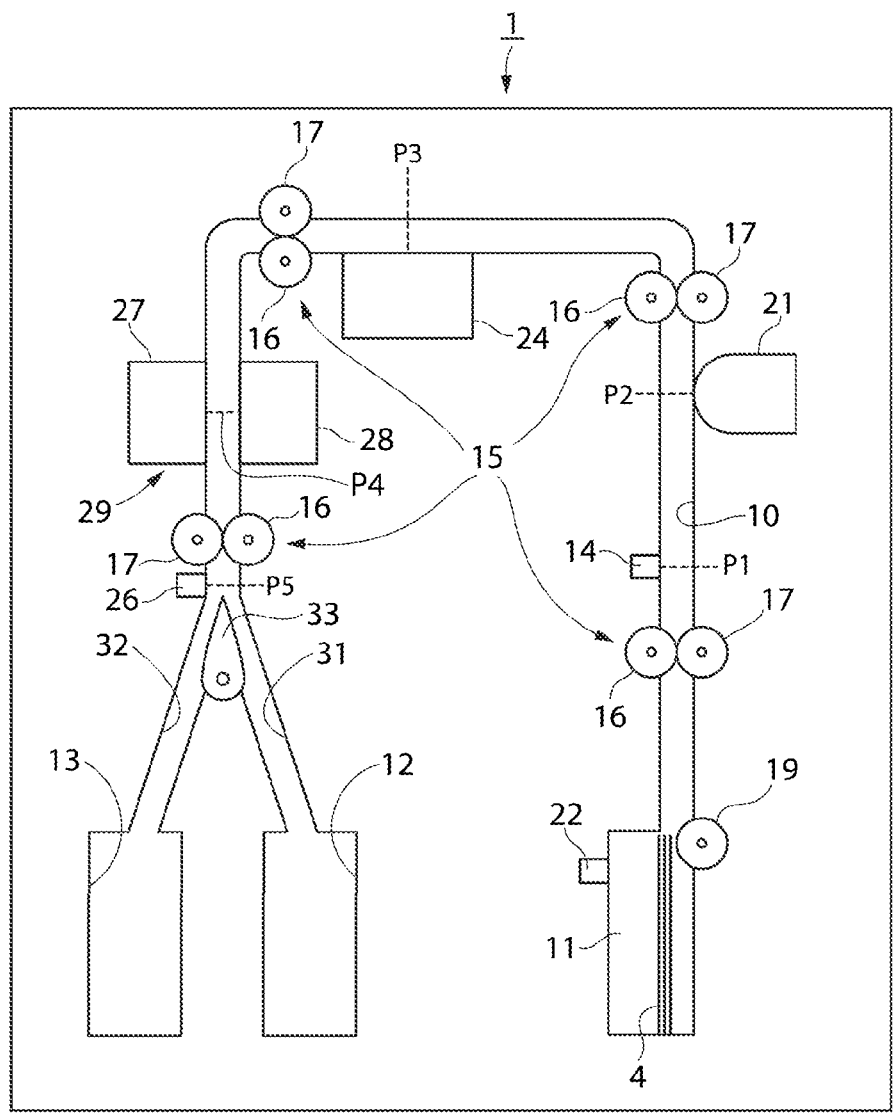
FIG. 1 describes the basic configuration of a check processing device according to a preferred embodiment of the invention.

FIG. 1 shows the configuration of a check processing device 1 as an example of a media processing device according to the invention, and more particularly is a schematic plan view of the internal structure.

The check processing device 1 is a device that functions to read a magnetic ink character line (MICR line) 4g that is recorded on a check 4 (FIG. 2) as an example of a recording medium, a function that records an image on the check 4, and a function that optically images both sides of the check 4.

Figure 2:
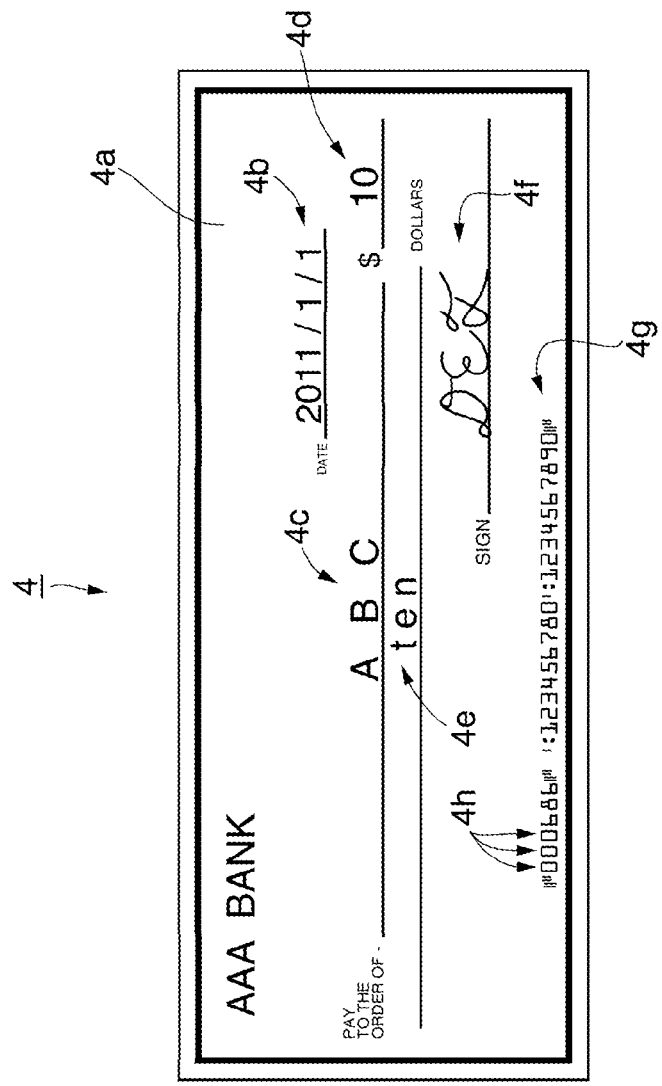
FIG. 2 shows an example of a check processed by the check processing device.

FIG. 2 shows an example of a check 4.

The check 4 is a sheet with a specific pattern or decorative background, and when a check 4 is issued by the check processing device 1, check information including the issue date 4b, payee information 4c, check amount in numbers 4d, check amount in words 4e, and authorized signature 4f are recorded on the face 4a (recording surface) of the check. The issue date 4b is information identifying the check 4 date. The payee information 4c is the name of the person or business receiving the issued check 4. The check amount in numbers 4d is the amount of the check 4 written in numerals. The check amount in words 4e is the amount of the check written in words. In this example the check amount in numbers 4d is "10" and the check amount in words 4e is "ten." The signature 4f is a graphic image of the signature of the person authorized to issue the check 4 (such as the manager of the department in the financial institution issuing the check 4).

An endorsement area for printing an endorsement is also provided on the back of the check 4. An endorsement may be recorded using specific text or an image in this endorsement area.

As shown in FIG. 2, an MICR line 4g is also printed along the length of check 4 on the face 4a. The MICR line 4g contains identification information unique to the check 4, and is a sequence of magnetic ink characters 4h printed using magnetic ink. Magnetic ink characters 4h are used to record information both magnetically using magnetic ink and optically (visually) using human-readable characters, and can therefore be read using both magnetically using magnetic ink character recognition (MICR) readers, and optically using optical character recognition (OCR) readers. The identification information expressed by the MICR line 4g includes information ("bank information" below) identifying the financial institution where the checking account against which the checks 4 are issued is held (referred to below for brevity as the "bank").

For convenience below, when a check 4 is issued by the check processing device 1, the five check information fields including the issue date 4b, payee information 4c, check amount in numbers 4d, check amount in words 4e, and signature 4f are printed on the face 4a of every check 4 regardless of the type of check 4. In practice, some of this check information may not be recorded, or additional check information may also be recorded.

As shown in FIG. 1, the check processing device 1 has a conveyance path 10 that is a narrow vertical channel with basically a U-shaped configuration when seen from above. One end of this conveyance path 10 is connected to a check supply hopper 11, which is a wide vertical slot, and the other end splits and is connected to a main pocket 12 and a sub-pocket 13, both of which are wide vertical slots. The conveyance path 10 starts at the check supply hopper 11, and ends at the main pocket 12 and sub-pocket 13.

The check supply hopper 11 can hold a plurality of (such as 100) unprocessed checks 4, and a pickup roller 19 is disposed thereto as an in-feed mechanism for feeding the stored checks 4 one at a time into the conveyance path 10. When loaded into the check supply hopper 11, the checks 4 are inserted with the face 4a facing the outside, and the checks 4 are conveyed through the conveyance path 10 with the face 4a facing the outside. The check processing device 1 also has a check supply detector 22 that detects whether or not a check 4 is stored in the check supply hopper 11. The check supply detector 22 is a transmissive photosensor in this embodiment.

A conveyance mechanism 15 that conveys the checks 4 in the conveyance direction is disposed to the conveyance path 10 of the check processing device 1. The conveyance mechanism 15 includes a plurality of conveyance rollers 16, a plurality of follower rollers 17 that are pressed against and follow the rotation of the matching conveyance rollers 16, and a conveyance motor 18 (FIG. 3) that drives the conveyance rollers 16. The conveyance rollers 16 and follower rollers 17 rotate as driven by the conveyance motor 18, and the checks 4 are conveyed in the conveyance direction, as controlled by a device-side control unit 20 described below. The conveyance motor 18 also functions as the drive power source driving the pickup roller 19 that feeds the checks 4 from the check supply hopper 11, and the conveyance mechanism 15 functions in conjunction with the pickup roller 19 and device-side control unit 20 as a conveyance unit.

A magnetic head 21 (information reading unit) that contacts the face 4a of the check 4 and magnetically reads the MICR line 4g is disposed downstream in the conveyance direction from the check supply hopper 11.

A printhead 24 is also disposed to the conveyance path 10 downstream in the conveyance direction from the magnetic head 21. The printhead 24 (print unit) is an inkjet recording head that ejects ink supplied from an ink tank not shown onto the back of the check 4 to record text or images. The nozzles of the printhead 24 are disposed facing the back of the checks 4 conveyed through the conveyance path 10, and print an endorsement by recording text or an image on a check 4 after magnetic character recognition by the magnetic head 21 is completed.

A CIS unit 29 including a front CIS (contact image sensor) 27 (optical reading unit) and a back CIS 28 (optical reading unit) is disposed to the conveyance path 10 downstream in the conveyance direction from the printhead 24. The front CIS 27 is disposed facing the face 4a of the check 4 conveyed through the conveyance path 10, optically images the face 4a of the check 4 conveyed through the conveyance path 10, and outputs the imaging result to the device-side control unit 20. The back CIS 28 is disposed facing the back of the check 4 conveyed through the conveyance path 10, optically images the back of the check 4 conveyed through the conveyance path 10, and outputs the imaging result to the device-side control unit 20.

At the downstream end of the conveyance path 10 the conveyance path 10 splits into a first discharge path 31 and a second discharge path 32, the first discharge path 31 leading to the main pocket 12 and the second discharge path 32 leading to the sub-pocket 13. A flapper 33 that selectively directs the checks 4 conveyed through the conveyance path 10 through the first discharge path 31 into the main pocket 12 or through the second discharge path 32 into the sub-pocket 13 is disposed at the junction with the conveyance path 10.

The flapper 33 is connected to a switching motor 34 (FIG. 3), and the device-side control unit 20 controls driving the switching motor 34 to switch the position of the flapper 33. For example, checks 4 from which the magnetic ink characters 4h could not be read by the magnetic head 21, checks 4 that were inserted with the top and bottom or front and back reversed and could be magnetically read correctly by the magnetic head 21, and checks 4 that could not be scanned correctly by the front CIS 27 and back CIS 28 are discharged into the sub-pocket 13, and checks 4 that were processed successfully in all processes are discharged into the main pocket 12.

Various check sensors for detecting checks 4 are also disposed along the conveyance path 10 of the check processing device 1. More specifically, the check processing device 1 has an edge detector 14 positioned on the upstream side of the magnetic head 21, and a discharge detector 26 positioned on the downstream side of the front CIS 27 and back CIS 28. The edge detector 14 and discharge detector 26 are reflective or transmissive photosensors, for example, and detect if a check 4 is at the respective detection positions P1 and P5. The edge detector 14 is used for detecting the leading end and trailing end of the check 4, and the device-side control unit 20 can detect the size of the check 4 based on the conveyance distance from when the leading end is detected until the trailing end is detected. The discharge detector 26 is used to detect discharge of the check 4 being conveyed, for example, and the device-side control unit 20 determines that the check 4 was discharged when the trailing end of the check 4 is detected by the discharge detector 26.

The check processing device 1 also has a sensor for detecting when checks 4 are multifed, and sensors for detecting when a check 4 is stuck or jammed.

The conveyance path 10 is short so that the check processing device 1 can process checks 4 at high speed, and the distance between the magnetic head 21 and printhead 24, and the distance between the printhead 24 and the back CIS 28 or front CIS 27, are shorter than the length of the check 4 in the conveyance direction of the conveyance path 10. As a result, the leading end of the check 4 reaches at least the printhead 24 when the magnetic head 21 finishes reading at least part of the MICR line 4g on the check 4; the leading end of the check 4 reaches at least the back CIS 28 or front CIS 27 when the printhead 24 finishes printing at least part of the check 4; and the leading end of the check 4 has at least entered the first discharge path 31 or second discharge path 32 when the back CIS 28 or front CIS 27 has finished scanning at least part of the check 4.

Figure 3:
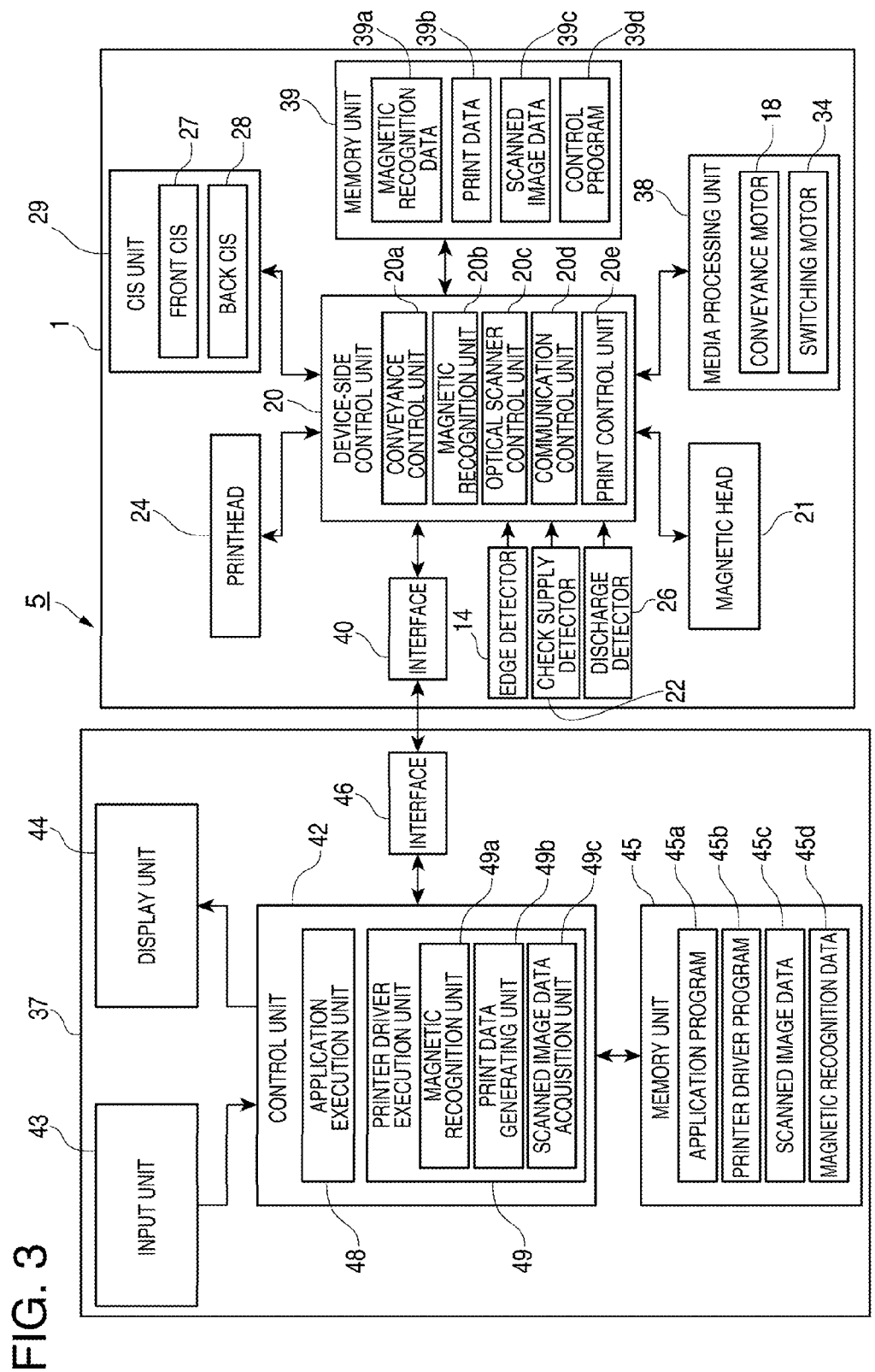
FIG. 3 is a block diagram showing the functional configuration of a recording system.

FIG. 3 is a block diagram showing the functional configuration of a check processing system 5 according to this embodiment of the invention.

The check processing system 5 includes a check processing device 1 and a host computer 37 (external device) that controls the check processing device 1. The check processing device 1 and host computer 37 are connected so that they can communicate with each other through a USB cable or other wired connection, or through a wireless communication unit.

As shown in FIG. 3, the check processing device 1 has a device-side control unit 20 that controls the parts of the check processing device 1. The device-side control unit 20 includes a CPU as an operating unit, a control program such as firmware that is run by the CPU, ROM that nonvolatilely stores data related to the control program, RAM that temporarily stores data related to the control program run by the CPU, and other peripheral circuits, and centrally controls the parts of the check processing device 1 by running this control program.

A memory unit 39 that stores the control program 39d executed by the device-side control unit 20 and other data is connected to the device-side control unit 20. The memory unit 39 could be EEPROM, flash memory, a hard disk drive, or other type of nonvolatile storage device, and stores programs and data rewritably. For example, the memory unit 39 stores the magnetic recognition data 39a that is the result of magnetic character recognition using the magnetic head 21, the print data 39b including image data and text data for the printhead 24 to print on the check 4, and the scanned image data 39c captured from the check 4 by the CIS unit 29.

By executing the memory unit 39 stored in the memory unit 39, the device-side control unit 20 functions as a conveyance control unit 20a, magnetic recognition unit 20b, optical scanner control unit 20c, communication control unit 20d, and print control unit 20e.

Based on the output of the edge detector 14, check supply detector 22, and discharge detector 26, the conveyance control unit 20a (control unit) drives the conveyance motor 18 and switching motor 34, and controls check 4 conveyance through the conveyance path 10.

The magnetic recognition unit 20b (recognition result acquisition unit, verification unit) applies a magnetic character recognition process that gets and recognizes the magnetically read data input from the magnetic head 21 as character data, and stores the recognition result as the magnetic recognition data 39a in the memory unit 39. If there is even only one character that cannot be recognized (identified) in the magnetic ink characters 4h contained in the MICR line 4g because of noise or other reason, the magnetic recognition unit 20b determines that reading the MICR line 4g failed and outputs an error. If the magnetic character recognition process recognizes characters based on the data read magnetically from the check 4 but the character string is not a character string that is recorded on a standard check 4, an error is output as the recognition result. As a result, the magnetic ink characters 4h can be verified because the magnetic recognition unit 20b can determine if the magnetically read data can be recognized, and can determine if correct information was recognized.

In this check processing system 5, the check processing device 1 can run the magnetic character recognition process based on the magnetically read data output by the magnetic head 21, and the host computer 37 can run the magnetic character recognition process based on the magnetically read data. In the former case the magnetic recognition unit 20*b* executes the magnetic character recognition process. In the latter case, the communication control unit 20*d* outputs the magnetically read data from the magnetic head 21 through the interface 40 to the host computer 37, the host computer 37 executes the recognition process and returns the result to the check processing device 1, and the check processing device 1 receives the data from the host computer 37 through the communication control unit 20*d*, and the magnetic recognition unit 20*b* stores the received recognition result in the memory unit 39. Whether the magnetic character recognition process is run by the check processing device 1 or the host computer 37 is preset in the host computer 37 or the check processing device 1. Whether the check processing device 1 or host computer 37 runs the process could alternatively be switched by a command sent from the host computer 37 to the check processing device 1. The communication control unit 20*d* and the interface 40 together render a communication unit.

Connected to the device-side control unit 20 are the magnetic head 21, printhead 24, CIS unit 29, edge detector 14, check supply detector 22, discharge detector 26, media processing unit 38, and interface 40.

The media processing unit 38 includes the conveyance motor 18 and switching motor 34, drives the conveyance mechanism 15, pickup roller 19, and flapper 33 as controlled by the conveyance control unit 20*a*, and conveys a check 4. The media processing unit 38 may also have other mechanisms or devices for processing the check 4 other than the conveyance motor 18 and switching motor 34, and processes the check 4 as controlled by the device-side control unit 20.

The magnetic head 21 generates detection signals based on the electromotive force (EMF) produced by change in the magnetic field formed by the MICR line 4*g* on the check 4 conveyed through the conveyance path 10, amplifies, wave shapes, and digitizes the generated detection signal, and outputs the result as the magnetically read data (the result of reading by the information reading unit) to the magnetic recognition unit 20*b*.

The optical scanner control unit 20*c* controls the front CIS 27 and back CIS 28 of the CIS unit 29 to optically image the face 4*a* or back of the check 4 conveyed through the conveyance path 10, and outputs the captured images to the device-side control unit 20. The optical scanner control unit 20*c* generates an image of the face 4*a* of the check 4 based on the output from the front CIS 27, and temporarily stores the image as the scanned image data 39*c* in the memory unit 39. The optical scanner control unit 20*c* likewise generates an image of the back of the check 4 based on the output from the back CIS 28, and stores the result as scanned image data 39*c*.

The interface 40 exchanges data with the host computer 37 according to a specific communication standard as controlled by the device-side control unit 20.

The communication control unit 20*d* controls the interface 40 to communicate with the host computer 37, and executes processes including a process of receiving a command to start check 4 processing from the host computer 37; a process of sending the magnetically read data acquired by the magnetic recognition unit 20*b* to the host computer 37, and receiving from the host computer 37 and outputting to the magnetic recognition unit 20*b* the result of the host computer 37 applying the recognition process to the magnetically read data; a process of receiving and storing print data from the host computer 37 as print data 39*b* in the memory unit 39; and a process of sequentially sending the scanned image data 39*c* stored in the memory unit 39 to the host computer 37.

Based on the print data 39*b* stored in the memory unit 39, the print control unit 20*e* drives the actuators of the printhead 24, ejects the required amount of ink from the nozzles formed in the recording head, and records images including text on the back of the check 4.

As shown in FIG. 3, the host computer 37 has a control unit 42, input unit 43, display unit 44, memory unit 45, and interface 46. The host computer 37 may be a personal computer or a server, for example. The control unit 42 includes a CPU, ROM, RAM, and other peripheral circuits, and centrally controls other parts of the host computer 37.

The control unit 42 includes an application execution unit 48 and a printer driver execution unit 49. The application execution unit 48 executes application programs 45*a* for processing checks, printing reports and forms, and managing payments and receipts. The printer driver execution unit 49 runs a printer driver program 45*b* for controlling the check processing device 1.

The printer driver execution unit 49 includes a magnetic recognition unit 49*a*, print data generating unit 49*b*, and scanned image data acquisition unit 49*c*.

The magnetic recognition unit 49*a* runs the magnetic character recognition process based on the magnetically read data received from the check processing device 1 through the interface 46, and outputs the character data or an error report as the recognition result.

The print data generating unit 49*b* generates and sends print data for the check processing device 1 to print an endorsement on the check 4 to the check processing device 1.

The scanned image data acquisition unit 49*c* receives and stores the scanned image data 39*c* from the check processing device 1 in the memory unit 45.

When character recognition based on the magnetically read data received from the check processing device 1 is successful, the magnetic recognition unit 49*a* outputs the resulting character data as the recognition result, and outputs an error if recognition based on the results data fails, such as when character recognition is not possible because of noise. When an error results, the conveyance control unit 20*a* could stop check 4 conveyance, or the checks 4 resulting in an error could be discharged to sub-pocket 13 separately from the checks 4 that are recognized normally and discharged into the main pocket 12.

When characters are recognized based on the magnetically read data from the check 4 but the character string is not a character string that is recorded to a standard check 4, the magnetic recognition unit 49*a* also outputs an error as the recognition result. As a result, the magnetic ink characters 4*h* can be verified because the magnetic recognition unit 49*a* can determine if the magnetically read data can be recognized, and can determine if correct information was recognized.

The print data generated by the print data generating unit 49*b* includes the date the check processing device 1 processed the check 4, and a serial number added to each check 4 processed that day. The check processing device 1 requests print data from the host computer 37 each time a check 4 is processed. When a request is received from the check processing device 1, the control unit 42 of the host computer 37 generates print data including the information for printing the check 4 being processed, and sends the print data through the interface 46 to the check processing device 1.

A memory unit 45 such as EEPROM, flash memory, a hard disk drive, or other type of nonvolatile storage device that stores programs and data rewritably is connected to the control unit 42. The memory unit 45 stores the application program 45a and printer driver program 45b executed by the control unit 42, the scanned image data 45c acquired by the scanned image data acquisition unit 49c, and the magnetic recognition data 45d resulting from the magnetic character recognition process executed by the magnetic recognition unit 49a.

The interface 46 communicates with the check processing device 1 according to a specific communication standard as controlled by the control unit 42. For example, as controlled by the control unit 42, the interface 46 sends a command to start check 4 processing to the check processing device 1; outputs magnetically read data from the check processing device 1 to the magnetic recognition unit 49a; and sends the recognition result output from the magnetic recognition unit 49a to the check processing device 1. When a print data request is sent from the check processing device 1, the interface 46 receives and outputs the request to the print data generating unit 49b, and then returns the print data generated by the print data generating unit 49b to the check processing device 1. The interface 46 also receives and outputs scanned image data sent from the check processing device 1 to the scanned image data acquisition unit 49c. The interface 46 and control unit 42 thus cooperate to function as a reception unit.

In the check processing system 5 thus comprised, the check processing device 1 applies the following sequence of processes to the checks 4. First, one of the checks 4 stored in the check supply hopper 11 is fed into the conveyance path 10 by the pickup roller 19, the MICR line 4g is read by the magnetic head 21, and the result is then recognized by the magnetic recognition unit 20b of the check processing device 1 or the magnetic recognition unit 49a of the host computer 37.

The magnetic recognition unit 20b acquires the recognition result by itself or from the magnetic recognition unit 49a, and determines if the MICR line 4g on the check 4 was recognized correctly. Based on the decision of the magnetic recognition unit 20b, the conveyance control unit 20a determines whether to discharge the read check 4 into the main pocket 12 or sub-pocket 13.

After check 4 conveyance starts, the print control unit 20e requests print data from the host computer 37, and receives and stores the print data sent from the host computer 37 in response to the request in the memory unit 39. The print control unit 20e drives the printhead 24 to print the received print data as an endorsement on the check 4 after the magnetic head 21 finishes reading. The printed check 4 is then conveyed to the CIS unit 29, and both sides are imaged by the front CIS 27 and back CIS 28. The check 4 is then discharged into the appropriate pocket based on the result of magnetic character recognition.

The check processing device 1 can selectively operate in an individual processing mode that processes the checks 4 one at a time, or a continuous processing mode that processes plural checks 4 continuously. The operating mode can be changed by a mode setting command sent from the host computer 37.

In the individual processing mode, the next check 4 to process is advanced by the pickup roller 19 after one check 4 is discharged into the main pocket 12 or sub-pocket 13.

In the continuous processing mode, however, the next check 4 to process is advanced by the pickup roller 19 while the previous check 4 is still travelling through the conveyance path 10, that is, before the check 4 is discharged into the main pocket 12 or sub-pocket 13. Plural checks 4 are therefore in the conveyance path 10 at the same time. The continuous processing mode is useful for high speed processing when, for example, checks are batch processed in a bank. The specifications of the continuous processing mode can be set as desired, and for brevity this embodiment describes an example in which a maximum of two checks 4 are present in the conveyance path 10 at the same time.

Figure 4:
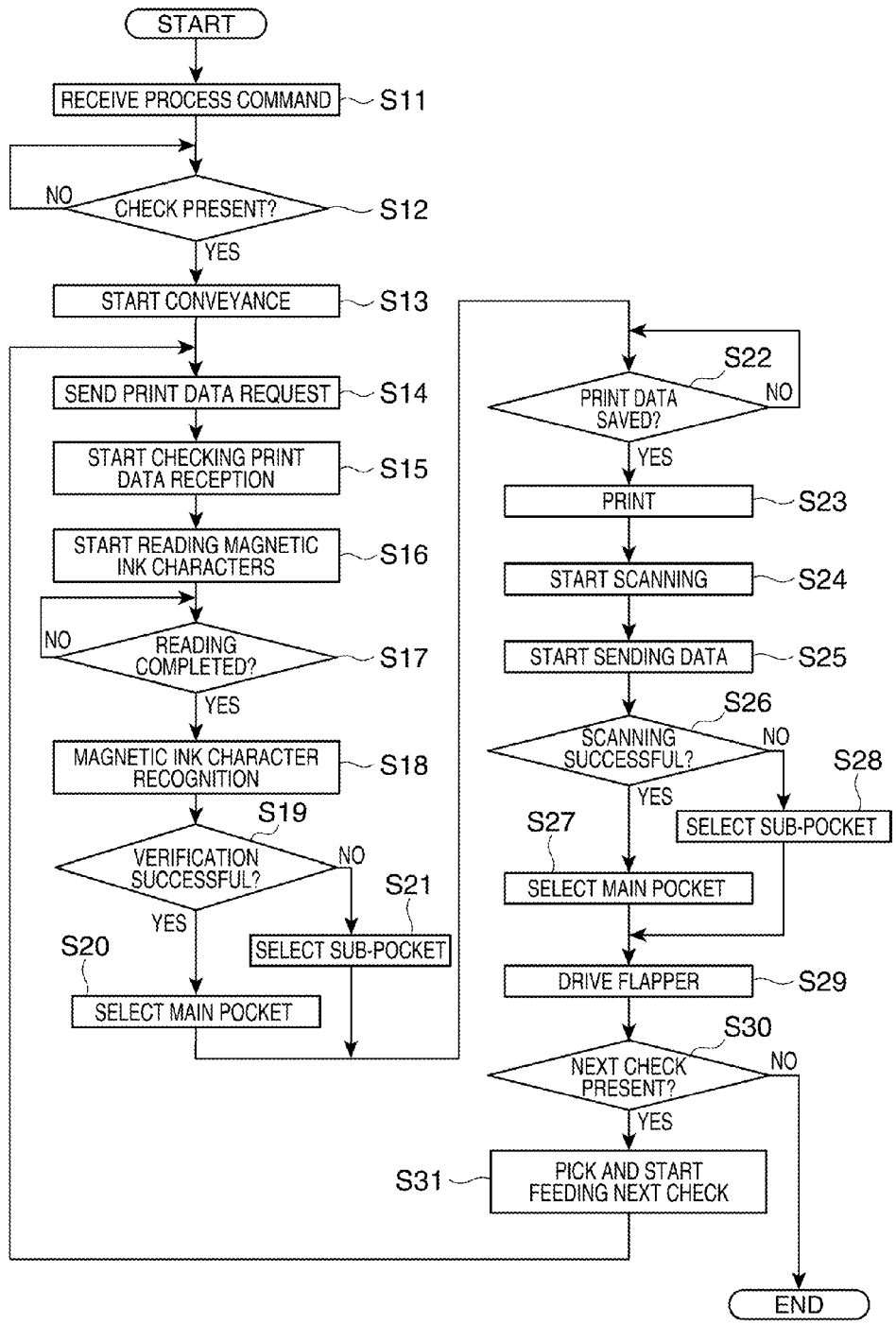
FIG. 4 is a flow chart of operation in the individual processing mode.

FIG. 4 is a flow chart of check processing device 1 operation in the individual processing mode.

When the individual processing mode starts and the check processing device 1 receives a start process command sent from the host computer 37 (step S11), the conveyance control unit 20a determines if a check 4 is present in the check supply hopper 11 based on the detection state of the check supply detector 22 (step S12). If a check 4 is not detected (step S12 returns No), the conveyance control unit 20a waits while checking the detection state of the check supply detector 22 at a specific interval until a check 4 is detected. When a check 4 is detected (step S12 returns Yes), the conveyance control unit 20a operates the conveyance motor 18 and drives the pickup roller 19 to pick and start feeding one check 4 from the check supply hopper 11 (step S13).

The print control unit 20e then sends a print data request to the host computer 37 (step S14), and then starts an operation checking (waiting) for receipt of the print data sent from the host computer 37 in response to the request (step S15). This operation continues in the background (parallel to other processes) until receiving the print data is completed. Note that print data may be sent from the host computer 37 before the print control unit 20e sends a print data request. The print control unit 20e stores the print data received through the interface 40 as print data 39b in the memory unit 39, and processes this stored print data 39b in the same way as the print data received in response to a print data request sent to the host computer 37.

When the leading end of the check 4 is detected by the edge detector 14, the magnetic recognition unit 20b starts reading the MICR line 4g with the magnetic head 21 when the leading end of the check 4 reaches the reading position P2 (FIG. 1) of the magnetic head 21 (step S16). The magnetic recognition unit 20b waits until the entire MICR line 4g is read (step S17 returns No), and when reading is completed (step S17 returns Yes), runs the recognition process based on the magnetically read data output from the magnetic head 21 (step S18). The magnetic recognition unit 20b can run the entire recognition process in step S18, or the magnetic recognition unit 20b could send the magnetically read data to the host computer 37 so that the magnetic recognition unit 49a of the host computer 37 runs the recognition process and the magnetic recognition unit 20b acquires the result of the recognition process from the magnetic recognition unit 49a.

The magnetic recognition unit 20b can determine that the check 4 was inserted with the top and bottom or the front and back reversed if even part of the beginning of the magnetically read data is below a specific threshold. If the check 4 is inserted with the top and bottom reversed, the MICR line 4g on the check 4 will not pass the reading position P2 of the magnetic head 21, and there will be substantially no change in the output of the magnetic head 21. If the check 4 is inserted with the front and back reversed, the MICR line 4g on the check 4 will pass the reading position P2 of the magnetic head 21 on the wrong side of the check 4 and will not directly contact the magnetic head 21, resulting in the signal level of the magnetically read data being lower than normal. This also enables the magnetic recognition unit 20b to determine that the check 4 is not positioned correctly.

These decisions can also be made by the host computer 37 instead of the magnetic recognition unit 20b. In this case, the check processing device 1 sends at least part of the beginning of the magnetically read data to the host computer 37, the host computer 37 makes the decision, and the check processing device 1 receives the decision and continues check processing accordingly.

For increased reliability, all of the magnetically read data can be used to determine the orientation of the check 4 in the individual processing mode.

The magnetic recognition unit 20b determines if verification of the entire MICR line 4g was successful (step S19), and based on the decision of the magnetic recognition unit 20b, the conveyance control unit 20a determines the discharge pocket of the check 4. More specifically, if verification was successful (step S19 returns Yes), the magnetic recognition unit 20b sets the output pocket for the check 4 being processed to the main pocket 12 (step S20), and if verification fails (step S19 returns No), sets the output pocket of the check 4 to the sub-pocket 13 (step S21).

The print control unit 20e then determines if print data received from the host computer 37 is stored in the memory unit 39 (step S22), and if receiving the print data is not completed (step S22 returns No), waits until receipt is completed. While waiting, the conveyance control unit 20a conveys the check 4 to before the printing position P3 of the printhead 24 (FIG. 1), and then stops and delays conveyance until printing starts.

When receiving the print data is completed, the print data is stored in the memory unit 39, and printing can start (step S22 returns Yes), the conveyance control unit 20a starts feeding the check 4 and the print control unit 20e drives the printhead 24 to print (step S23). When the check 4 then reaches the scanning position P4 of the front CIS 27 and back CIS 28 (FIG. 1), the optical scanner control unit 20c controls the front CIS 27 and back CIS 28 to start imaging both sides of the check 4 (step S24), starts generating and storing the scanned image data 39c, and sends the generated scanned image data 39c sequentially from the beginning to the host computer 37 (step S25).

After finishing optically imaging both sides of the check 4, the optical scanner control unit 20c determines if imaging was successful (step S26). Imaging success means that image data for all of both sides is created and transmission to the host computer 37 is completed. The conveyance control unit 20a then determines the discharge pocket of the check 4 based on the decision from the optical scanner control unit 20c. More specifically, the conveyance control unit 20a sets the output pocket of the check 4 being processed to the main pocket 12 (step S27) if optical imaging is successful (step S26 returns Yes), and sets the output pocket of the check 4 to the sub-pocket 13 (step S28) if imaging fails (step S26 returns No).

The conveyance control unit 20a then operates the flapper 33 according to the destination of the check 4 being conveyed (step S29), and discharges the check 4 into the main pocket 12 or sub-pocket 13. Note that this embodiment discharges the check 4 into the sub-pocket 13 if there is a failure in either verification of the MICR line 4g or imaging by the CIS unit 29. As a result, when the destination is set to the sub-pocket 13 in step S21, the output pocket remains set to the sub-pocket 13 even if optical imaging is then successful in step S26. More specifically, the setting decided in step S21 has priority over the setting decided in step S27. The setting made in step S20 likewise takes priority over the setting in step S28.

Based on the detection state of the check supply detector 22, the conveyance control unit 20a determines if a check 4 to scan next is present (step S30), and ends the process if there is no check 4 to process next (step S30 returns No). If there is a check 4 to process next (step S30 returns Yes), the conveyance control unit 20a operates the conveyance motor 18 and drives the pickup roller 19 to pick the next single check 4 and start conveyance (step S31), and then returns to step S14.

The user can process checks while verifying them one at a time in the individual processing mode. If reading fails because the check 4 was loaded in the wrong orientation (top-bottom upside-down or front-back backwards), the check 4 is discharged into the sub-pocket 13 and can be easily reloaded by the user into the check supply hopper 11 and processed again.

Operation in the continuous processing mode is described next.

Figure 5:
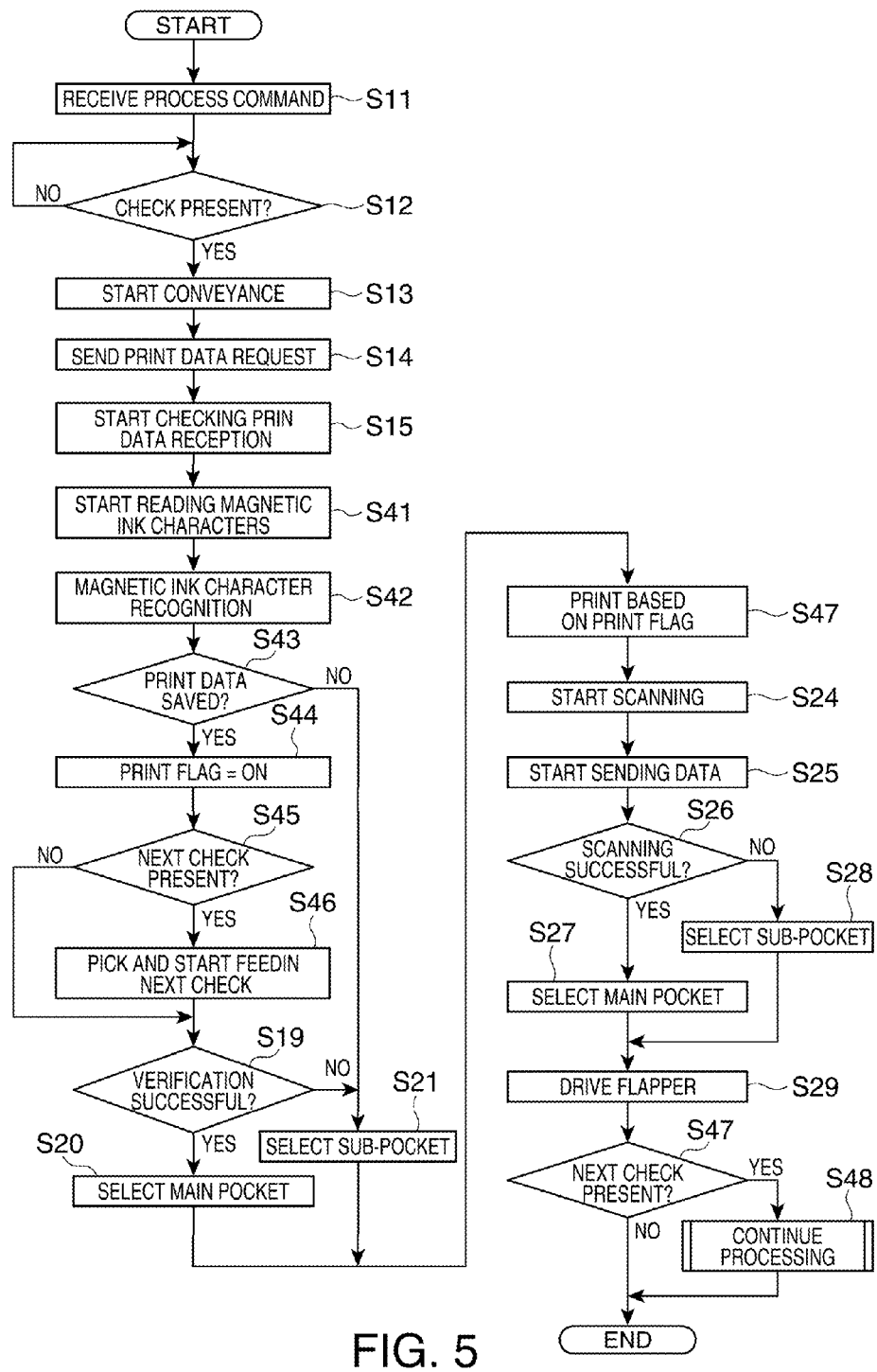
FIG. 5 is a flow chart of operation in the continuous processing mode.

FIG. 5 is a flow chart showing the operation of the check processing device 1 in the continuous processing mode. Note that identical steps in FIG. 4 and FIG. 5 are identified by the same reference numerals.

If the continuous processing mode was previously set to the continuous processing mode by a mode selection command received from the host computer 37, for example, and a start process command is received from the host computer 37 (step S11), the device-side control unit 20 of the check processing device 1 starts operation in the continuous processing mode.

The conveyance control unit 20a then determines if a check 4 is present in the check supply hopper 11 based on the detection state of the check supply detector 22 (step S12), and if a check 4 is not detected (step S12 returns No) waits until a check 4 is detected. When a check 4 is in the check supply hopper 11 (step S12 returns Yes), the conveyance control unit 20a operates the conveyance motor 18 to pick and start feeding one check 4 from the check supply hopper 11 (step S13).

The print control unit 20e then sends a print data request to the host computer 37 (step S14), and then starts an operation checking for receipt of the print data sent from the host computer 37 in response to the request (step S15). This operation continues in the background until receiving the print data is completed.

The magnetic recognition unit 20b then reads the MICR line 4g with the magnetic head 21 timed to the leading end of the check 4 reaching the reading position P2 of the magnetic head 21 (FIG. 1) (step S41). The magnetic recognition unit 20b executes the recognition process based on the magnetically read data output from the magnetic head 21 (step S42). As in step S18 in FIG. 4, the magnetic recognition unit 20b can run the recognition process itself in step S42, or the magnetic recognition unit 20b could send the magnetically read data to the host computer 37 so that the magnetic recognition unit 49a of the host computer 37 runs the recognition process and the magnetic recognition unit 20b acquires the result of recognition in the recognition process from the magnetic recognition unit 49a.

Because the waveform data (magnetically read data) output by the magnetic head 21 will have a specific waveform when the MICR line 4g is read normally by the magnetic head 21, the device-side control unit 20 can determine that at least part of the MICR line 4g was correctly read based on the waveform data even before verification of the data as characters by the magnetic recognition unit 20b (the stage before verification).

The magnetic recognition unit 20b can determine that the MICR line 4g was read normally when at least part of the beginning of the waveform data is acquired based on whether the waveform data of this part is greater than a specific threshold. This is because if the check 4 is inverted top-bottom or front-back, the waveform data will be below this specific threshold. If the magnetic head 21 cannot read the MICR line 4g normally, and the device-side control unit 20 cannot acquire the specific waveform data, the device-side control unit 20 can determine that reading was not successful based on the waveform data even before character recognition by the magnetic recognition unit 20*b*.

More specifically, because whether the orientation of the check 4 is inverted top-bottom or front-back can be determined, and conveyance of the next check 4 does not start if reading is not successful, the check 4 being processed in the wrong orientation can be reloaded in the correct orientation in the check supply hopper 11 by the user, and can be processed again. In addition, because conveyance of the check 4 can be stopped before printing by the print control unit 20*e*, printing the check 4 in the wrong orientation can be prevented.

Alternatively, checks 4 that are not read successfully could be conveyed without printing by the print control unit 20*e* and stored separated from normally read checks in the sub-pocket 13.

By counting the rotations of the conveyance motor 18 after the edge detector 14 detects the leading end of the check 4, the conveyance control unit 20*a* can detect the position of the leading end of the check 4 on the conveyance path 10. When the conveyance motor 18 is a stepper motor, the conveyance distance of the check 4 can be detected from the number of steps the motor is driven.

After the edge detector 14 detects the leading end of the check 4 and detects the check 4 position, the magnetic head 21 reads at least part of the beginning of the MICR line 4*g*, and the magnetic recognition unit 20*b* determines if the MICR line 4*g* was read normally, the conveyance control unit 20*a* can determine from the rotation of the conveyance motor 18 if the leading end of the check 4 has reached the printhead 24 position.

If the MICR line 4*g* was read normally and at least the leading end of the check 4 has reached the printhead 24, whether the print data has been received and the printhead 24 can start printing the check 4 is determined.

If printing the check 4 can start, the conveyance control unit 20*a* starts conveying the next check 4 or starts preparing to convey a check by starting detection by the check supply detector 22.

The conveyance control unit 20*a* determines if receiving the print data requested by the print control unit 20*e* has been completed and printing is possible (step S43). More specifically, the conveyance control unit 20*a* determines if print data received from the host computer 37 is stored in the memory unit 39.

If receiving print data is completed (step S43 returns Yes), the conveyance control unit 20*a* turns the print flag on (step S44). This print flag is set for each conveyed check 4, and the print flag setting is stored in memory unit 39, for example.

The conveyance control unit 20*a* then determines if a check 4 is in the check supply hopper 11 based on the detection state of the check supply detector 22 (step S45), and if a check 4 is present (step S45 returns Yes), operates the conveyance motor 18 to pick and start conveying one check 4 from the check supply hopper 11 (step S46). The device-side control unit 20 then returns to step S14 for the check 4 that started conveyance in step S46. If a check 4 is not in the check supply hopper 11, step S46 is skipped.

The magnetic recognition unit 20*b* then determines if the verification attempted in step S42 was successful (step S19), and the conveyance control unit 20*a* determines the output pocket for the check 4 based on the decision from the magnetic recognition unit 20*b*. More specifically, the magnetic recognition unit 20*b* sets the destination for the check 4 being processed to the main pocket 12 (step S20) if verification is successful (step S19 returns Yes), and if verification fails (step S19 returns No), sets the output destination for the check 4 to the sub-pocket 13 (step S21).

If print data was not recorded in step S43 (step S43 returns No), the conveyance control unit 20*a* sets the destination to the sub-pocket 13 (step S21).

If print data was not received, or if receiving print data is not completed and printing is not possible, conveying the next check 4 does not start. The user can then remove and reload the unprinted check 4 from the sub-pocket 13 to the check supply hopper 11 to be processed again.

The print control unit 20*e* then drives the printhead 24 to print based on the print flag setting (step S47). More specifically, the print control unit 20*e* prints if the print flag is on, and if the print flag is not on, goes to the next step without printing. The continuous processing mode is configured to not print on a check 4 if receiving print data is not completed by a specific time (step S43).

When the check 4 then reaches the scanning position P4 of the front CIS 27 and back CIS 28 (FIG. 1), the optical scanner control unit 20*c* controls the front CIS 27 and back CIS 28 to start imaging both sides of the check 4 (step S24), starts generating and storing the scanned image data 39*c*, and sends the generated scanned image data 39*c* sequentially from the beginning to the host computer 37 (step S25). Whether the leading end of the check 4 has reached the scanning position P4 of the front CIS 27 and back CIS 28 can be determined from the rotation of the conveyance motor 18.

After finishing optically imaging both sides of the check 4, the optical scanner control unit 20*c* determines if imaging was successful (step S26). More specifically, the optical scanner control unit 20*c* sets the output pocket of the check 4 being processed to the main pocket 12 (step S27) if optical imaging is successful (step S26 returns Yes), and sets the output pocket of the check 4 to the sub-pocket 13 (step S28) if imaging fails (step S26 returns No). Whether or not imaging was successful can be determined based on whether the output value of the front CIS 27 and back CIS 28 is within a specific range. When there is substantially no change in the output, or brightness is extremely low or high relative to a specific threshold, imaging is determined to have failed.

The conveyance control unit 20*a* then operates the flapper 33 according to the destination of the check 4 being conveyed (step S29), and discharges the check 4 into the main pocket 12 or sub-pocket 13. Note that this embodiment discharges the check 4 into the sub-pocket 13 if there is a failure in either verification of the MICR line 4*g* or imaging by the CIS unit 29. As a result, when the destination is set to the sub-pocket 13 in step S21, the output pocket remains set to the sub-pocket 13 even if optical imaging is then successful in step S26. More specifically, the setting decided in step S21 has priority over the setting decided in step S27. The setting made in step S20 likewise takes priority over the setting in step S28.

Because the length of the conveyance path 10 in the check processing device 1 is short as described above, whether or not a check 4 can be processed normally is determined when part of the MICR line 4*g* waveform data has been acquired instead of after the entire MICR line 4*g* is read, and based on this decision whether or not to print with the printhead 24, and whether to discharge the check 4 into the main pocket 12 or sub-pocket 13, are determined. Whether to print with the printhead 24 is also determined based on whether or not the print data has been received by the time the leading end of the check 4 has reached the printhead 24.

By thus determining control of downstream devices as soon as possible based on such information as the detection state or reception status of a device located at the upstream side of the conveyance path 10, stopping processing can be minimized, mistakenly or needlessly executing processes such as reading information or printing can be avoided as much as possible, and media can be desirably processed rapidly even when the length of the conveyance path 10 is short.

Furthermore, because the length of the conveyance path 10 in the check processing device 1 is short, when the result of deciding if at least part of the waveform data from the MICR line 4g is normal, the result of verifying the result of reading at least part of the MICR line 4g, and the result of evaluating at least part of the image data captured by the CIS unit 29, are acquired, part of the check 4 has already entered the main pocket 12 or sub-pocket 13 depending upon the actual length of the conveyance path 10, and in the check processing device 1 according to this embodiment of the invention enters the main pocket 12. This is because the device-side control unit 20 normally sets the flapper 33 to the main pocket 12 based on the assumption that most checks 4 are processed normally. When verifying the waveform data captured from the MICR line 4g, recognizing the MICR line 4g, or optical imaging by the CIS unit 29 is determined to be unsuccessful, the conveyance control unit 20a therefore reverses the check 4 from the main pocket 12 into the conveyance path 10, the flapper 33 is switched, and the conveyance control unit 20a then conveys and discharges the check 4 into the sub-pocket 13.

The conveyance control unit 20a then determines if the next check 4 after the discharged check 4 is in the conveyance path 10 (step S47). If a next check 4 is not present (step S47 returns No), the process ends. If a next check 4 is in the conveyance path 10 (step S47 returns Yes), the conveyance control unit 20a continues applying steps S14 to S29, and more specifically steps S47 to S29, to the check 4 being conveyed and any checks 4 following thereafter (step S48).

Figure 6:
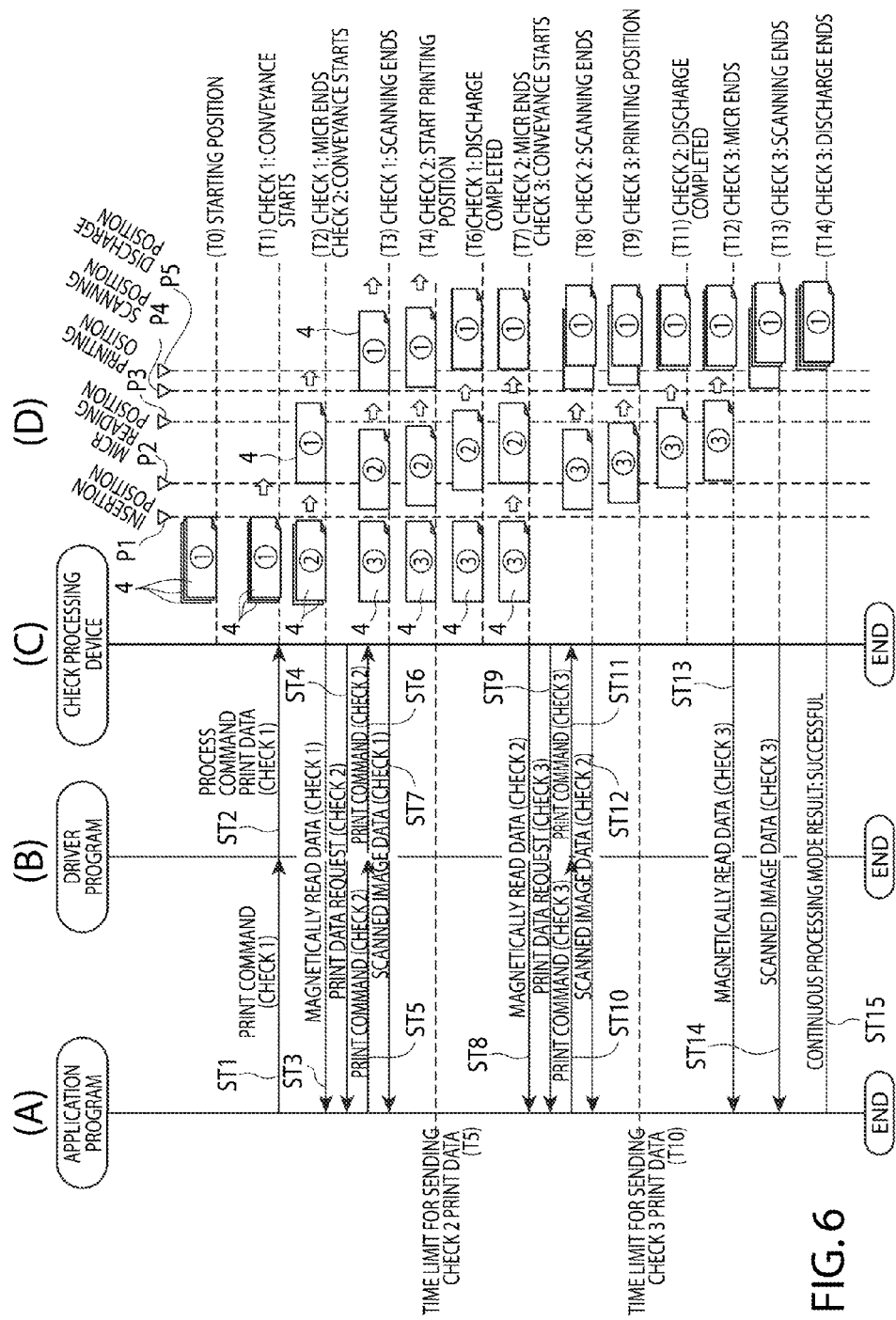
FIG. 6 is a sequence diagram of check conveyance in the continuous processing mode.
Figure 7:
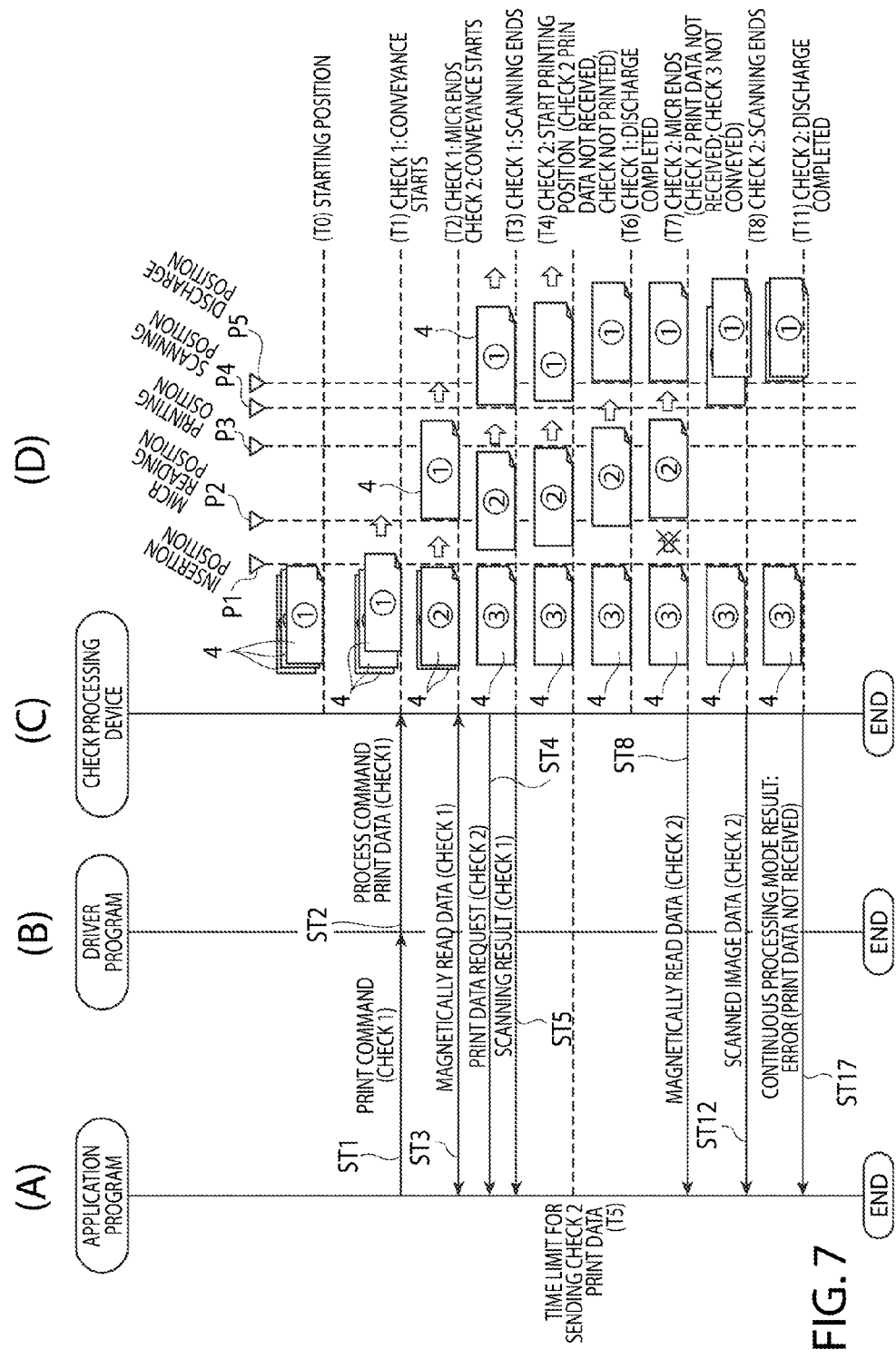
FIG. 7 is a sequence diagram of check conveyance in the continuous processing mode.

FIG. 6 and FIG. 7 are sequence diagrams showing conveyance of a check 4 in the continuous processing mode. In both FIG. 6 and FIG. 7, (A) shows the operation of the application execution unit 48 of the host computer 37, (B) the operation of the printer driver execution unit 49, (C) the operation of the check processing device 1, and (D) the conveyance positions of checks 4 on the conveyance path 10. In FIG. 6 and FIG. 7 detection position P1 is the detection position (media insertion position) of the edge detector 14, P2 is the reading position (MICR reading position) of the magnetic head 21, P3 is the printing position of the printhead 24, P4 is the imaging position of the CIS unit 29, and P5 is the discharge detector 26 detection position (media discharge position). The locations of positions P1 to P4 are as shown in FIG. 1.

As shown in FIG. 6 (D) and FIG. 7 (D), the distance between the reading position P2 of the magnetic head 21 and the printing position P3 is shorter than the length of a check 4 in the conveyance path 10. This length could be the full length of the check 4. In this embodiment, this length is the distance between the trailing end of the MICR line 4g (FIG. 2) and the leading end of the printing area (not shown) on the back of the check 4. The leading end of the check 4 or the leading end of the print area on the check 4 therefore reaches the printing position P3 before the trailing end of the check 4 or the trailing end of the MICR line 4g passes the reading position P2. As a result, printing the check 4 starts before reading the MICR line 4g on the check 4 is completed.

The distance between the printing position P3 and scanning position P4 is also shorter than the length of the check 4, and more specifically is shorter than from the leading end of the check 4 to the trailing end of the printing area of the check 4. As a result, the CIS unit 29 starts optically imaging the check 4 before printing the check 4 ends.

FIG. 6 shows operation in the continuous processing mode when checks are processed normally.

In the example shown in FIG. 6, three checks 4 are set in the check supply hopper 11 in the initial state (T0) before operation starts.

When the application execution unit 48 of the host computer 37 starts processing and outputs a command to print a check 4 in response to a command input from a keyboard or other input unit 43 (step ST1), the printer driver execution unit 49 generates print data for the print command from the application execution unit 48, and sends the print data with a command to process the check 4 to the check processing device 1 (step ST2). The check processing device 1 receives the command sent by the host computer 37, starts conveying the first check 4 (T1), and receives and stores print data in the memory unit 39. As a result, the print data for printing the first check 4 has already been received when processing the first check 4 starts. In this case the check processing device 1 can decide to start the check 4 process when only print data has been received from the host computer 37, and can start the process even if all print data has not been received. Receiving the print data must simply be completed before the check 4 reaches the printing position P3.

The check processing device 1 starts conveying the second check 4 when the magnetic head 21 has finished reading the MICR line on the first check 4 (T2) and before verifying if magnetic ink character reading was successful. Conveying the first check 4 continues, the printhead 24 starts printing when the check 4 reaches the printing position P3, and imaging both sides starts when the check 4 reaches the scanning position P4 of the CIS unit 29. Conveying the second check 4 from (T2) also continues, the MICR line is read when passing the reading position P2 of the magnetic head 21, and the second check 4 reaches the printing position P3 where printing starts (T4).

If it is determined that the MICR line could not be read normally based on the result of reading at least part of the MICR line because the check 4 is inverted top and bottom or front and back, imaging by the CIS unit 29 and printing can both be cancelled before the check 4 reaches the printhead 24. The check 4 can also be flagged for discharge into the sub-pocket 13. Starting conveyance of the second check can also be stopped when it is determined that the MICR line could not be read normally.

When the magnetic head 21 finishes reading the MICR line on the first check 4 (T2), the check processing device 1 sends the magnetically read data to the host computer 37 (step ST3). This magnetically read data is passed from the printer driver execution unit 49 to the application execution unit 48, and is verified by the application execution unit 48 using a function of the MICR application.

In this case the check processing device 1 sends the result of reading at least part of the MICR line to the host computer 37, and based on this partial result the host computer 37 can determine if magnetic ink character reading is not normal because the check 4 is inverted top-bottom or front-back, send this decision to the check processing device 1, and based thereon the check processing device 1 can prevent printing.

Based on step ST3, the check processing device 1 sends a print data request for printing the second check 4 to the host computer 37 (step ST4).

The application execution unit 48 of the host computer 37 outputs a print command in response to the print data request (step ST5), and the printer driver execution unit 49 generates and sends print data for the print command to the check processing device 1 (step ST6).

Print data for the second check 4 must be received from the host computer 37 before the second check 4 reaches the printing position P3. More specifically, the time when the leading end of the check 4 or the leading end of the printing area on the back of the check 4 reaches the printing position P3 is the end time (T5) for transmitting print data for the second check. If the print data has not been sent from the host computer 37 by this end time, the check processing device 1 does not print the second check 4.

Note that T5 is the time limit by which the check processing device 1 must have finished receiving the print data. In this embodiment the communication speed between the check processing device 1 and host computer 37 is sufficiently fast compared with the amount of print data, and there is no practical need to consider the time from when the printer driver execution unit 49 sends the print data to when the check processing device 1 finishes receiving the print data. As a result, the time limit for the check processing device 1 to receive print data and the time limit for the host computer 37 to send the print data are described here as substantially the same. For example, when the time from when the host computer 37 sends the print data to when the check processing device 1 finishes receiving the print data cannot be ignored, T5 is the time limit for receiving all of the print data, and the host computer 37 must send the print data in time to meet this time limit for receiving the print data.

If the print data for the second check 4 is sent by the print data transmission time limit (T5), the second check 4 is printed and the first check 4 is discharged into the main pocket 12 or sub-pocket 13 (T6). When reading the MICR line 4g on the second check 4 ends (T7), the check processing device 1 sends the magnetically read data to the host computer 37 (step ST8). The check processing device 1 also checks discharge of the first check 4, starts conveyance of the third check 4, and sends a print data request for printing the third check 4 to the host computer 37 (step ST9).

The application execution unit 48 of the host computer 37 outputs a print command in response to the print data request (step ST10), and the printer driver execution unit 49 generates and sends print data for the print command to the check processing device 1 (step ST11). Because the second check 4 passes the scanning position P4 in the check processing device 1 during this time (T8), the check processing device 1 sends the scanned image data for the second check 4 to the host computer 37 (step ST12).

The time (T9) when the third check 4 reaches the printing position P3 is the time limit (T10) for sending print data for the third check 4. If print data for the third check 4 is sent by the print data transmission time limit (T10), the third check 4 is printed, and the second check 4 is discharged into the main pocket 12 or sub-pocket 13 (T11).

When the third check 4 passes the reading position P2 (T12), the MICR data is sent from the check processing device 1 to the host computer 37 (step ST13), the check 4 passes the scanning position P4 and is imaged (T13), and the scanned image data for the third check 4 is sent to the host computer 37 (step ST14). The check 4 is discharged into the main pocket 12 or sub-pocket 13 (T14), a process result indicating that continuous processing finished normally is sent from the check processing device 1 to the host computer 37 (step ST16), and the process ends.

FIG. 7 shows an example of operation in the continuous processing mode when print data is not transmitted in time.

When receiving the print data for the second check 4 is not completed by the print data transmission time limit (T5) for the print data for the second check 4 in the operation described in FIG. 6, the check processing device 1 continues processing the first and second checks 4 without printing on the second check 4, which has already reached the printing position P3. As a result, conveyance of the first and second checks 4 does not stop. When the check 4 is then discharged (T6) and the second check 4 passes the reading position P2 of the magnetic head 21 (T7), the check processing device 1 sends the magnetically read data to the host computer 37 (step ST8) but does not start conveyance of the third check 4. This is to temporarily stop operation of the check processing device 1 because the second check 4 was not printed. When the second check 4 passes the scanning position P4 (T8), the check processing device 1 sends the scanned image data from the second check 4 to the host computer 37 (step ST12), sends a process report indicating that an error occurred in the continuous processing mode to the host computer 37 (step ST17), and stops.

In the continuous processing mode, the check processing device 1 can thus start conveying one check 4 after another and process plural checks 4 quickly without waiting for the result of verification based on the magnetically read data output from the magnetic head 21. When print data has not been received by the time the check 4 reaches the printing position P3, the printing process is skipped instead of stopping check 4 conveyance, and processing the checks 4 on the conveyance path 10 continues to read the MICR line 4g and scan with the CIS unit 29. As a result, the processes that can be performed are applied to the checks 4 in the conveyance path 10 even if the print data has not been received. Conveyance of the next check 4 also does not start even if a check 4 is in the check supply hopper 11, and the check processing device 1 can be quickly stopped. Only the processes that can be performed are therefore executed to avoid a drop in process efficiency when an error such as not receiving the print data occurs, and the check processing device 1 can be stopped quickly while minimizing the number of checks 4 that are not processed completely.

As described above, a check processing system 5 according to an embodiment of at least part of the invention has a check processing device 1 with a communication unit that can connect to a host computer 37, the check processing device 1 including a conveyance unit that conveys checks 4; a magnetic head 21 that reads information recorded on a check 4 in the check 4 conveyance path 10; a magnetic recognition unit 20b that sends at least part of the information read by the magnetic head 21 through the communication unit to the host computer 37, which verifies the received information and sends the verification result to the check processing device 1, and acquires the result of verifying the read information from the host computer 37 through the communication unit; and a conveyance control unit 20a that based on the result of verification starts conveying the check 4 to be processed next after the check 4 that was read. Because the conveyance control unit 20a has an individual processing mode in which the conveyance unit starts conveying the check 4 to be read next after the result of verification by the magnetic recognition unit 20b is acquired, and a continuous processing mode in which conveying the check 4 to be read next starts without waiting to acquire the result of verification by the magnetic recognition unit 20b after information is read by the magnetic head 21, the check processing device 1 can quickly process many checks 4 continuously in the continuous processing mode.

A printhead 24 is also disposed as a processing unit that processes checks 4 downstream in the conveyance direction from the reading position of the magnetic head 21 on the check 4 conveyance path 10. Because the conveyance control unit 20a does not start conveying the check 4 to be read next when operating in the continuous processing mode and printing with the printhead 24 is not possible because the print data has not been received, for example, after the magnetic head 21 reads at least part of the magnetic data, incomplete processing can be prevented, the number of checks 4 that are not completely processed can be minimized when processing is stopped unavoidably, and the problem can be quickly corrected.

Note that if at least part of the print data has been received when at least the leading end of the check 4 has reached the position of the printhead 24, printing could start and processing continue anticipating that receiving all of the print data will be completed while printing is in progress.

The check processing device 1 also has a print control unit 20e that sends a print data request to the host computer 37 and acquires data for printing sent from the host computer 37. Because the conveyance control unit 20a does not start conveying the check 4 to be read next when operating in the continuous processing mode and at least part of the print data from the host computer 37 has not been acquired by the print control unit 20e after the magnetic head 21 reads the magnetic data, printing in an incomplete state can be prevented and printing errors can be avoided. The number of checks 4 that are not completely processed can also be minimized when processing is stopped unavoidably, and the problem can therefore be quickly corrected.

Because the magnetic recognition unit 20b determines if the MICR line is correctly read based on part of the information read by the magnetic head 21, checks 4 can be processed continuously without waiting for a verification result based on all information or characters, a long delay is not imposed by spending time verifying all information or characters, and continuous processing is possible even when accelerating the verification process is difficult.

The magnetic recognition unit 20b can also receive the result of the verification process executed by the host computer 37 to determine from part of the read information if the information read by the magnetic head 21 was read correctly, and an increase in the processing time due to communication with the host computer 37 can be suppressed in this case even if there is a long delay waiting to receive the result of verifying all information or characters from the host computer 37.

The distance between the magnetic head 21 and the printhead 24 on the conveyance path 10 that conveys checks 4 in the check processing device 1 is shorter than the length of the check 4 in the conveyance direction, and the conveyance control unit 20a controls the conveyance unit to start conveying the next check 4 from the check supply hopper 11 when at least the leading end of the check 4 reaches the printhead 24 after at least part of the information on the check 4 has been read by the magnetic head 21. Therefore, when the conveyance path 10 of the check processing device 1 is short, information on the check 4 is read by the magnetic head 21, and it is determined that at least part of the information has been read, conveying the next check 4 starts before at least a position at the leading end of the check 4 on the conveyance path 10 reaches the position where printing by the printhead 24 is possible.

As a result, multiple checks 4 can be processed continuously at high speed. In addition, even before the information on the check 4 has been recognized as characters, if the information on the check 4 cannot be read correctly by the magnetic head 21 because the check 4 is upside down or reversed front and back can be determined based on part of the information read from the check 4 by the magnetic head 21. Because conveying the next check 4 does not start if the information was not read correctly, a check 4 processed in the wrong orientation can be reloaded and processed again. In addition, because check 4 conveyance can be stopped before printing by the printhead 24, printing on a check 4 in the wrong orientation can be avoided.

The check processing device 1 also has a print control unit 20e that acquires data for printing from the host computer 37 through a communication unit. When at least the leading end of the check 4 reaches the printhead 24 after at least part of the information on the check 4 has been read by the magnetic head 21, the conveyance control unit 20a starts conveying the next check 4 if the print control unit 20e has acquired at least part of the print data from the host computer 37 through the communication unit, and does not start conveying the next check 4 if the print data has not been received. As a result, when the print data has not been received and printing is not possible, conveying the next check 4 does not start and the check 4 that could not be printed can be reloaded and processed.

A preferred embodiment of the invention is described above, and the invention is obviously not limited thereto. For example, the recording medium processed by the check processing device 1 in the above check processing system 5 is not limited to checks 4, other types of forms and documents can also be processed, and the size of the recording media that can be used in the check processing device 1 is not specifically limited.

The foregoing embodiment describes using a magnetic head 21 as an information reading unit to read magnetic ink characters from the check 4 used as a recording medium, using a printhead 24 as a processing unit to print on the check 4, and using a CIS unit 29 as a processing unit to optically image the check 4, but the invention is not so limited. For example, the CIS unit 29 could first optically scan the check 4 as the information reading unit, the device-side control unit 20 could apply optical character recognition to the scanned image, and the printhead 24 and magnetic head 21 could perform other processes as processing units. The print unit used in the check processing device 1 is also not limited to using an inkjet recording head, and a thermal printer, dot impact printer, laser printer, dye sublimation printer, or other type of printer could be used instead.

A configuration in which the host computer 37 externally connected to the check processing device 1 controls the check processing device 1 is described in the foregoing embodiment, but a configuration having the host computer 37 and check processing device 1 combined in a single device is also conceivable.

The function units shown in the block diagram in FIG. 3 describe a functional configuration, there is no need to render the function units as discrete hardware devices, and configurations in which the functions of plural function units are rendered by a single hardware device through the cooperation of hardware and software, and configurations in which a single function unit is rendered by a plurality of hardware devices, are conceivable.

The programs including the control program 39d executed by the CPU of the device-side control unit 20 that performs the above-described operations are not limited to being stored by the memory unit 39. More specifically, configurations in which the programs are be stored on a removable recording medium, and configurations in which the programs can be downloaded from another device connected over a communication line and the check processing device 1 downloads the programs from another device, are also conceivable. The application program 45a and printer driver program 45b executed by the control unit 42 can be similarly stored, and other aspects of the embodiment can also be changed as desired.

What is claimed is:

1. A media processing device, comprising:
   a conveyance unit that conveys a recording medium;
   a first processing unit that processes information of the recording medium conveyed by the conveyance unit in a recording medium conveyance path;
   a verification result acquisition unit that acquires a result of a verification of the information processed by the first processing unit; and
   a control unit that selectively operates in an individual processing mode, or a continuous processing mode;
   wherein
      in the individual processing mode the control unit starts conveying the next recording medium after the result of the verification is acquired by the verification result acquisition unit, and
      in the continuous processing mode the control unit starts conveying the next recording medium without waiting for the verification result acquisition unit to acquire the result of the verification of the information processed by the first processing unit.

2. The media processing device described in claim 1, further comprising:
   a second processing unit that processes the recording medium at a position on the recording medium conveyance path downstream in a conveyance direction from the processing position of the first processing unit;
   wherein in the continuous processing mode the control unit does not start conveying the next recording medium to be processed after partial processing by the first processing unit if the second processing unit cannot process the recording medium.

3. The media processing device described in claim 2, wherein:
   the second processing unit is a print unit that prints on the recording medium; and
   in the continuous processing mode the control unit does not start conveying the next recording medium to be processed after partial processing by the first processing unit when the data for printing has not been received.

4. The media processing device described in claim 2, wherein the second processing unit is a print unit that prints on the recording medium; and wherein the media processing device further comprises:
   a third processing unit that processes the recording medium at a position on the recording medium conveyance path on the downstream side in the conveyance direction from the second processing unit;
   wherein, when in the continuous processing mode and when the print unit has received at least part of the print data, the control unit enables processing by the third processing unit, and does not enable processing of the recording medium by the third processing unit when print data has not been received by the print unit.

5. The media processing device described in claim 1, further comprising:
   a verification unit that performs the verification based on recording medium information processed by the first processing unit.

6. The media processing device described in claim 1, wherein:
   a distance along the conveyance path between the first processing unit and the second processing unit is shorter than a length of the recording medium.

7. The media processing device described in claim 1, further comprising:
   a communication unit that can connect to an external device;
   wherein the communication unit sends information processed by the first processing unit to the external device, and receives the result of the verification of the information processed by the first processing unit from the external device through the communication unit.

8. A method of controlling a media processing device, the method comprising:
   conveying a recording medium along a recording medium conveyance path;
   processing information of the recording medium in the recording medium conveyance path at a first location along the conveyance path;
   acquiring a result of a verification of the information processed at the first location; and
   determining a processing mode for a control unit; and
      when in an individual processing mode, conveying the next recording medium after the result of the verification is acquired, and
      when in a continuous processing mode, conveying the next recording medium without waiting for acquisition of the result of the verification.

9. The method of claim 8, further comprising:
   processing the recording medium at a second location on the recording medium conveyance path downstream in a conveyance direction from the first location;
   wherein, in the continuous processing mode, conveying the next recording medium to be processed does not start after partial processing at the first location if the recording medium cannot be processed at the second location.

10. The method of claim 9, wherein:
    the recording medium is processed at the second location by a print unit that prints on the recording medium; and
    in the continuous processing mode, the control unit does not start conveying the next recording medium to be processed after partial processing at the first location when the data for printing has not been received by the print unit.

11. The method of claim 9, wherein the recording medium is processed at the second location by a print unit that prints on the recording medium; and wherein the method further comprises:
    processing the recording medium at a third location on the recording medium conveyance path on the downstream side in the conveyance direction from the second location;
    wherein, when in the continuous processing mode and when the print unit has received at least part of the print data, the control unit enables processing at the third location, and does not enable processing of the recording medium at the third location when print data has not been received by the print unit.

12. The method of claim 8, further comprising:
    performing the verification based on recording medium information processed at the first location.

13. The method of claim 8, wherein:
    a distance along the conveyance path between the first location and the second location is shorter than a length of the recording medium.

14. The method of claim 8, further comprising:
    sending information processed at the first location to an external device, and
    receiving the result of the verification of the information processed at the first location from the external device through a communication unit.

* * * * *